(12) United States Patent
Lee et al.

(10) Patent No.: US 6,981,840 B2
(45) Date of Patent: Jan. 3, 2006

(54) CONVERGING PIN COOLED AIRFOIL

(75) Inventors: Ching-Pang Lee, Cincinnati, OH (US); Ronald Scott Bunker, Niskayuna, NY (US); Chander Prakash, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 141 days.

(21) Appl. No.: 10/692,700

(22) Filed: Oct. 24, 2003

(65) Prior Publication Data
US 2005/0169752 A1   Aug. 4, 2005

(51) Int. Cl.
  *F03D 11/00*   (2006.01)
(52) U.S. Cl. ..................... 415/115; 416/97 R
(58) Field of Classification Search ................ 415/115; 416/97 R
  See application file for complete search history.

(56) References Cited

U.S. PATENT DOCUMENTS

| | | | |
|---|---|---|---|
| 2,956,773 A * | 10/1960 | French ...................... | 416/97 R |
| 3,819,295 A | 6/1974 | Hauser et al. | |
| 3,844,678 A * | 10/1974 | Sterman et al. ........... | 416/97 R |
| 4,312,624 A * | 1/1982 | Steinbauer et al. ......... | 415/115 |
| 4,407,632 A | 10/1983 | Liang | |
| 5,215,431 A | 6/1993 | Derrien | |
| 5,370,499 A | 12/1994 | Lee | |
| 5,383,766 A | 1/1995 | Przirembel et al. | |
| 5,392,515 A | 2/1995 | Auxier et al. | |
| 5,419,681 A | 5/1995 | Lee | |
| 5,690,472 A | 11/1997 | Lee | |
| 5,720,431 A | 2/1998 | Sellers et al. | |
| 5,924,483 A | 7/1999 | Frasier | |
| 5,931,638 A | 8/1999 | Krause et al. | |
| 6,254,334 B1 | 7/2001 | LaFleur | |
| 6,402,470 B1 | 6/2002 | Kvasnak et al. | |
| 6,514,042 B2 | 2/2003 | Kvasnak et al. | |
| 6,832,889 B1 * | 12/2004 | Lee et al. .................... | 415/115 |

FOREIGN PATENT DOCUMENTS

EP           1022432           7/2000

* cited by examiner

*Primary Examiner*—Edward K. Look
*Assistant Examiner*—Igor Kershteyn
(74) *Attorney, Agent, or Firm*—William S. Andes; Francis L. Conte

(57) ABSTRACT

A turbine airfoil includes pressure and suction sidewalls extending in chord between leading and trailing edges and in span between a root and a tip. A septum is spaced between the sidewalls to define two cooling circuits on opposite sides of the septum which converge between the leading and trailing edges. An array of pins extends inwardly from the pressure sidewall at a discharge end of the circuits, and the pins decrease in length to conform with the converging circuit.

25 Claims, 3 Drawing Sheets

CONVERGING PIN COOLED AIRFOIL

The U.S. Government may have certain rights in this invention pursuant to contract number F33615-02-C-2212 awarded by the U.S. Department of the Air Force.

BACKGROUND OF THE INVENTION

The present invention relates generally to gas turbine engines, and, more specifically, to turbine blade cooling therein.

In a gas turbine engine, air is pressurized in a multistage compressor and mixed with fuel for generating hot combustion gases in a combustor. The gases are discharged through a high pressure turbine (HPT) which powers the compressor, typically followed by a low pressure turbine (LPT) which provides output power by typically powering a fan at the upstream end of the engine. This turbofan configuration is used for powering commercial or military aircraft.

Engine performance or efficiency may be increased by increasing the maximum allowed operating temperature of the combustion gases that are discharged to the HPT which extracts energy therefrom. Furthermore, engines are continually being developed for increasing cruise duration and distance, for one exemplary commercial application for a supersonic business jet and for an exemplary military application such as a long range strike aircraft.

Increasing turbine inlet temperature and cruise duration correspondingly increases the cooling requirements for the hot engine components, such as the high pressure turbine rotor blades. The first stage rotor blades receive the hottest combustion gases from the combustor and are presently manufactured with state-of-the-art superalloy materials having enhanced strength and durability at elevated temperature. These blades may be configured from a myriad of different cooling features for differently cooling the various portions of the blades against the corresponding differences in heat loads thereto during operation.

The presently known cooling configurations for first stage turbine blades presently limit the maximum allowed turbine inlet temperature for obtaining a suitable useful life of the blades. Correspondingly, the superalloy blades are typically manufactured as directionally solidified materials or monocrystal materials for maximizing the strength and life capability thereof under the hostile hot temperature environment in the gas turbine engine.

The intricate cooling configurations found in the blades are typically manufactured using common casting techniques in which one or more ceramic cores are utilized. The complexity of the cooling circuits in the rotor blades is limited by the ability of conventional casting processes in order to achieve suitable yield in blade casting for maintaining competitive costs.

Like the first stage turbine blades, the first stage turbine nozzle includes hollow vanes which require suitable cooling for extended life while exposed to the hot combustion gases. The vanes, like the blades have corresponding airfoil configurations, and include internal cooling circuits of various configurations specifically tailored to cool the different parts of the vanes corresponding with the different heat loads from the combustion gases.

Accordingly, it is desired to provide a turbine airfoil having an improved cooling configuration for further advancing temperature and durability thereof in a gas turbine engine.

BRIEF DESCRIPTION OF THE INVENTION

A turbine airfoil includes pressure and suction sidewalls extending in chord between leading and trailing edges and in span between a root and a tip. A septum is spaced between the sidewalls to define two cooling circuits on opposite sides of the septum which converge between the leading and trailing edges. An array of pins extends inwardly from the pressure sidewall at a discharge end of the circuits, and the pins decrease in length to conform with the converging circuit.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
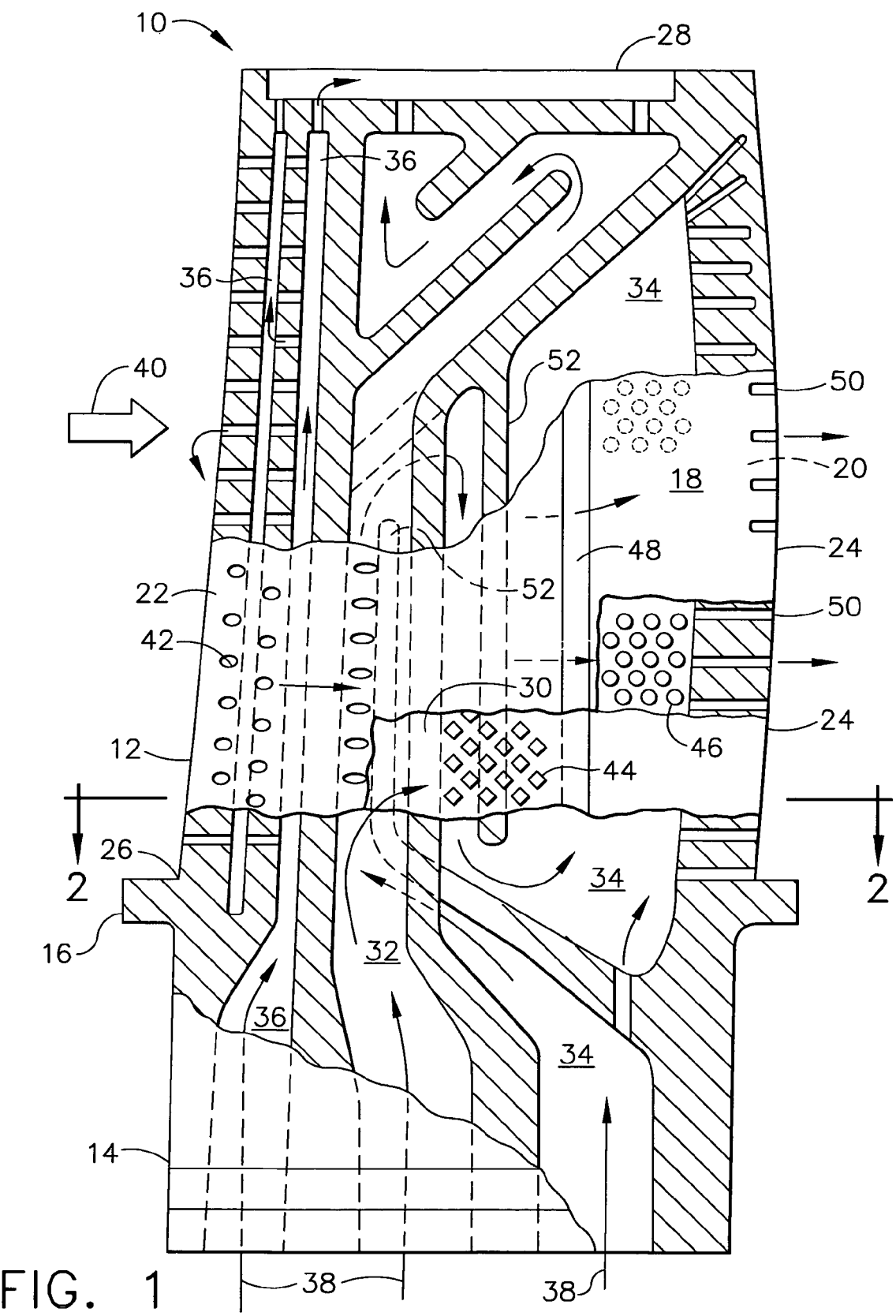
FIG. 1 is an axial sectional view in elevation of an exemplary high pressure turbine rotor blade having pin bank sidewall cooling.

Illustrated in FIG. 1 is an exemplary first stage turbine rotor blade 10 for use in a gas turbine engine in a high pressure turbine immediately downstream from a combustor thereof. The blade may be used in an aircraft gas turbine engine configuration, or may also be used in non-aircraft derivatives thereof.

The blade includes a hollow airfoil 12 extending radially in span outwardly from a supporting dovetail 14 joined together at a common platform 16. The dovetail may have any conventional configuration including dovetail lobes or tangs which mount the blade into a corresponding dovetail slot in the perimeter of a turbine rotor disk (not shown). The dovetail is joined to the integral platform by a shank therebetween.

The airfoil 12 includes a concave pressure sidewall 18 and a laterally or circumferentially opposite convex suction sidewall 20. The two sidewalls are joined together at axially or chordally opposite leading and trailing edges 22, 24, and are spaced apart therebetween. The airfoil sidewalls and edges extend radially in span from an inner root 26 to an outer tip 28. The dovetail is integrally joined to the airfoil at the platform disposed at the airfoil root which defines the radially inner boundary for the combustion gases which flow around the airfoil during operation.

Figure 2:
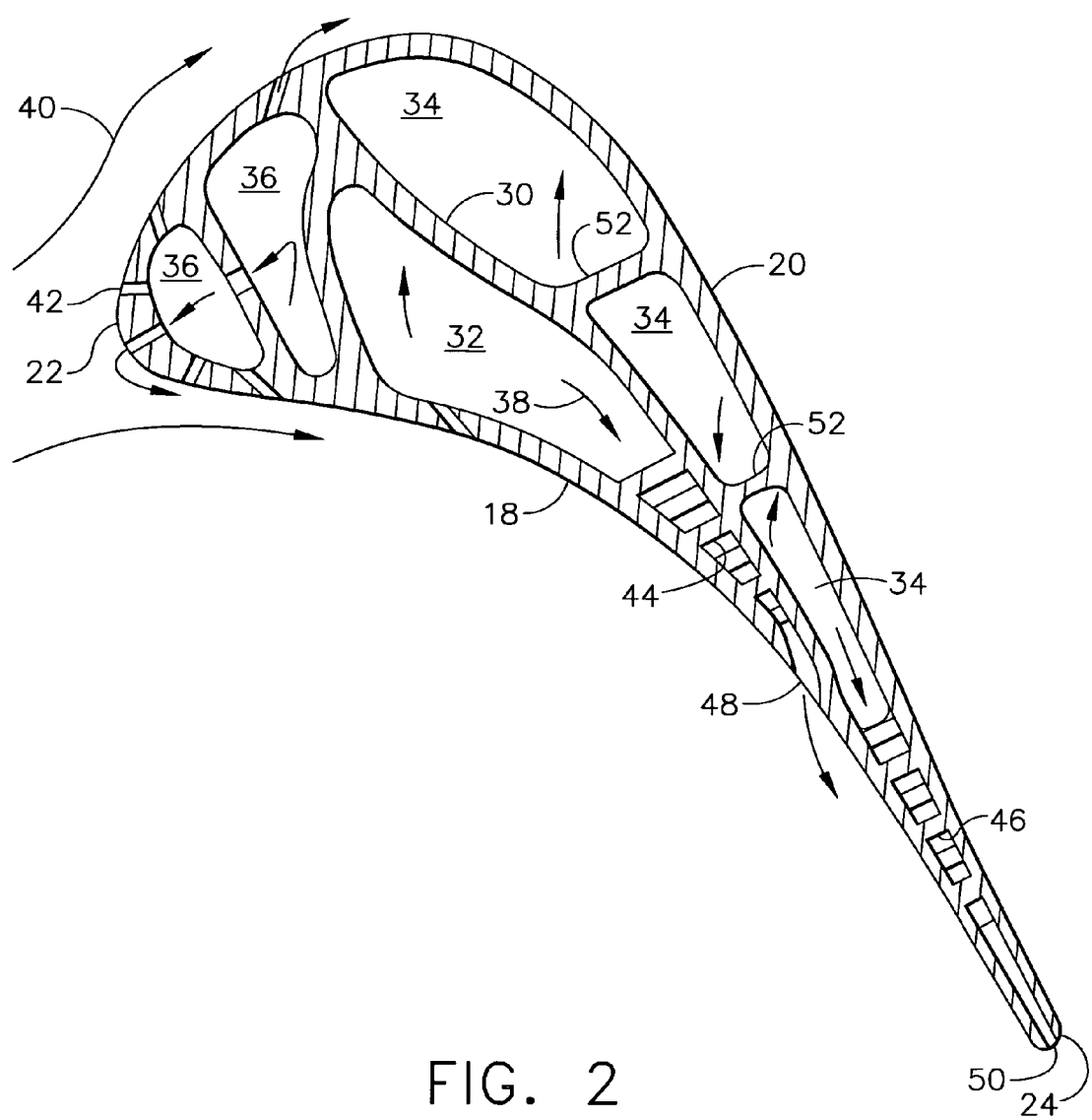
FIG. 2 is a radial sectional view of the blade airfoil illustrated in FIG. 1 and taken along line 2—2.

As shown in FIGS. 1 and 2, the airfoil further includes an imperforate wall or septum 30 spaced generally in the middle between the pressure and suction sidewalls 18,20 to define with those sidewalls two independent cooling circuits 32, 34 on opposite sides of the septum.

The septum 30 commences behind the leading edge 22 integrally with the suction sidewall 20, and terminates in front of the trailing edge 24 integrally with the pressure sidewall 18 for generally splitting in two the airfoil along the camber line. Disposed immediately behind the leading edge 22 is a third cooling circuit 36.

The three circuits 32, 34, 36 are preferably independent from each other, and each receives cooling air 38 through a corresponding inlet extending radially through the dovetail 14 and platform 16. The cooling air is typically compressor discharge air suitably channeled from the compressor (not shown) of the gas turbine engine.

The several cooling circuits are specifically configured or tailored for suitably cooling their respective portions of the airfoil for withstanding the corresponding heat loads from combustion gases 40 which flow over the external surfaces of the airfoil during operation.

The third cooling circuit 36 may have any conventional configuration, and may include corresponding bridges extending between the pressure and suction sidewalls of the airfoil which define two corresponding flow channels 36 that extend radially in span behind the leading edge of the airfoil and between the opposite sidewalls. The center bridge between the two channels includes a row of impingement holes through which a portion of the cooling air 38 is firstly directed in impingement against the internal surface of the airfoil behind the leading edge. The leading edge includes several rows of film cooling holes 42 which then discharge the spent impingement air along the external surfaces of the airfoil for providing film cooling in a conventional manner.

However, the two side-cooling circuits 32, 34 extend in span along opposite sides of the middle septum 30 for providing enhanced cooperation therebetween and enhanced cooling therefrom. In particular, the first circuit 32 is disposed along the inside of the pressure sidewall 18, and the second circuit 34 is disposed along the inside of the suction sidewall 20, and extends in part aft from the first circuit to the trailing edge 24.

As best illustrated in FIG. 2, the two cooling circuits 32, 34 both converge between the leading and trailing edges in the axial or chordal direction for correspondingly accelerating the cooling air therethrough during operation.

Correspondingly, a bank or array of turbulator pins 44, 46 extends transversely inwardly from the pressure sidewall 18 at the discharge end of one or both of the two circuits for providing local mesh cooling in their coverage region or area. The pins bridge the converging circuits and correspondingly decrease in length to conform with the converging profiles of the circuits in the axial or chordal direction between the leading and trailing edges.

The two circuits 32, 34 include corresponding outlets spaced chordally apart on the pressure sidewall for discharging the cooling air from the respective circuits. The first circuit 32 includes a first outlet in the form of a radially elongate slot 48 extending in span along the pressure sidewall. The second circuit includes a second outlet in the form of a radial row of outlet apertures 50 which extend axially between the pressure and suction sidewalls and terminate adjacent the trailing edge 24.

Figure 3:
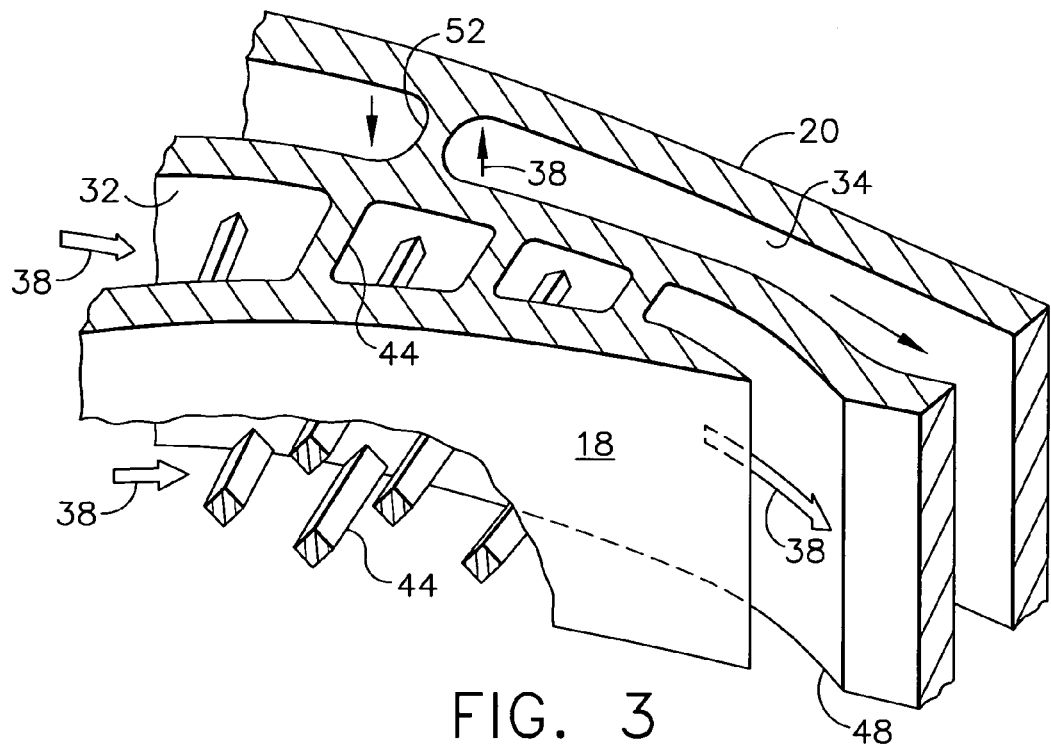
FIG. 3 is an enlarged isometric view of a portion of the airfoil shown in FIG. 2 illustrating one embodiment of the pin bank configuration disposed in the pressure sidewall upstream from the trailing edge.

As shown in FIGS. 2 and 3, the first array of pins 44 is disposed in the first circuit 32 immediately upstream or forward from the first outlet slot 48 for discharging the cooling air 38 in a continuous film along the span of the slot.

The first circuit 32 preferably consists of a single channel extending in radial span along the pressure sidewall to provide a common inlet converging to the array of first pins 44, which channel continues to converge in the axially aft direction to the common outlet slot 48. In this way, the cooling air is initially channeled radially upwardly through the dovetail into the first circuit channel 32 and then is distributed along the full height of the bank of first pins 44, which redirect the cooling air axially aft towards the common outlet slot 48. If desired, one or more radially aligned outlet slots 48 may be used.

This configuration provides many advantages. Firstly, the bank of first pins 44 are preferably spaced apart both in span and chord along the pressure sidewall 18 for providing a circuitous flowpath immediately behind the pressure sidewall for providing enhanced cooling thereof, with the spent cooling air then being discharged through the common outlet slot 48 for providing a continuous film of cooling air downstream therefrom to the airfoil trailing edge 24. The local mesh cooling effected by the bank of pins 44 provides enhanced cooling in this local region of the pressure sidewall which is subject to high heat loads from the external combustion gases that flow thereover during operation.

The axially converging first circuit 32 accelerates cooling air therethrough and between the first bank of pins 44, with the spent cooling air then being diffused in the common outlet slot 48 prior to discharge over the pressure sidewall. The turbulator pins at the forward or inlet side of the pin bank are correspondingly longer than those at the aft or outlet end of the pin bank and correspondingly generate more turbulence in the cooling air. The longer pins also have more heat transfer area for enhancing heat transfer from the hot pressure sidewall.

Correspondingly, the shorter pins near the outlet of the first circuit may be used to limit the flow area between the pins and meter or control the flowrate of the cooling air discharged through the first circuit. Collectively, the first pins 44 of short to long length provide heat conduction between the hot pressure sidewall and the relatively cold internal septum 30 which splits the airfoil in two parts.

The septum 30 itself is cooled on both surfaces thereof by the corresponding first and second cooling circuits 32, 34 and provides an improved heat sink for the heat conducted through the first pin bank 44. Since the septum 30 splits the airfoil in two parts, each part, including the corresponding circuits 32, 34, has a relatively large width, which increases the strength of the corresponding ceramic cores which may used in the casting process for the manufacture of the airfoils using conventional practice. Thicker cores are preferred over thinner cores to increase the strength thereof, and correspondingly increase the effective yield. Thin cores are problematic and increase difficulty of casting, and typically result in smaller yields.

As shown in FIG. 2, the second circuit 34 preferably includes a plurality of imperforate, transverse bridges 52 which integrally join together the suction sidewall 20 and the septum 30 to define a three-pass serpentine circuit which discharges the cooling air through the second outlet aperture 50 at the airfoil trailing edge. The first pass or channel of the second circuit includes an inlet extending through the dovetail, and shown in FIG. 1, and the three channels converge in the axially aft direction illustrated in FIG. 2 as the suction sidewall and septum converge together toward the trailing edge.

As illustrated in FIG. 2, one of the cold bridges 52 in the second circuit 34 integrally joins together the suction sidewall 20 and the septum 30 directly behind the first pin array 44. This bridge provides additional conduction for removing heat from the first pin array 44. This bridge also increases the stiffness of the airfoil between the pressure and suction sidewalls in the location of the first pin array 44.

Accordingly, the hot pressure sidewall 18 illustrated in FIG. 2 is cooled by the cooperation of the single channel first circuit 32 in which the cooling air directly cools the first bank of pins 44 by internal convection and conduction, followed in turn by using the spent cooling air to form a cooling film discharge from the outlet slot 48.

The heat input from the combustion gases flowing over the suction sidewall 20 is typically less than that from the pressure sidewall, and the three-pass serpentine second circuit 34 may be used for channeling another portion of the cooling air independently from the first circuit, and cooling the suction sidewall in turn along the corresponding portions of the serpentine circuit. The spent serpentine cooling air is then discharged through the last channel of the converging second circuit 34 through the decreasing-size bank of second pins 46 for discharge through the trailing edge 24.

The trailing edge outlet apertures 50 illustrated in FIG. 2 are positioned in the middle between the pressure and suction sidewalls near the root of the airfoil illustrated in FIG. 1. However, the outlet apertures 50 may breach the pressure sidewall of the airfoil immediately short of the trailing edge as the trailing edge decreases in thickness along the span of the airfoil as also illustrated in FIG. 1.

Figure 4:
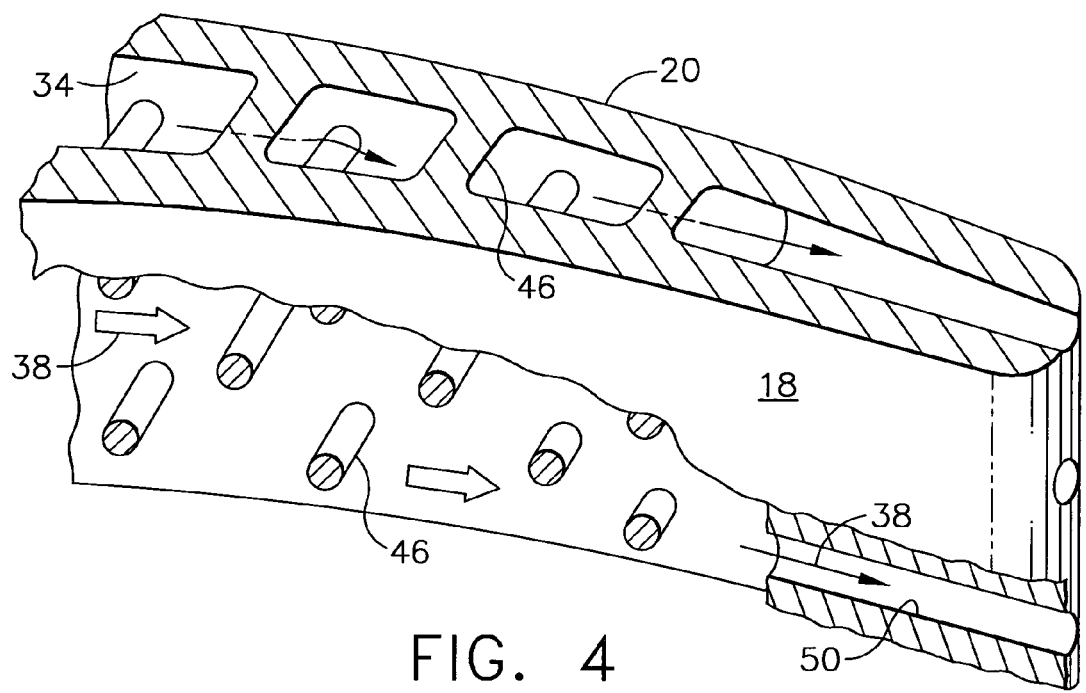
FIG. 4 is an isometric view of another portion of the airfoil shown in FIG. 2 illustrating a second embodiment of the pin bank located along the trailing edge.

As shown in FIGS. 1, 2, and 4, the second array of turbulator pins 46 may be used at the discharge end of the second circuit 34 in combination with the first array of turbulator pins 44 disposed in the discharge end of the first circuit 32. The bank of second pins 46 illustrated in FIGS. 2 and 4 is located immediately upstream from the row of second outlet apertures 50, and correspondingly decreases in length as the two sides of the airfoil converge together to the trailing edge.

In this configuration, the second pin array 46 is disposed downstream from the first pin array 44 immediately aft of the outlet slot 48, and integrally joins together the pressure and suction sidewalls in the trailing edge region of the airfoil.

Like the first pin array 44, the second pin array 46 provides enhanced cooling of the pressure sidewall due to the decreasing length of the turbulator pins therein, and the converging portion of the second circuit flow channel 34. However, the cold septum 30 terminates before the bank of second pins 46, and therefore does not provide the additional cooling advantage found with the first pin array 44.

The corresponding turbulator pins 44, 46 of the two mesh arrays are similarly spaced apart both in span and chord along the pressure sidewall for providing corresponding circuitous flowpaths for discharging cooling air from the airfoil.

The pins 44, 46 in the two banks may have uniform spacing as illustrated in FIGS. 3 and 4, or may have variable spacing as the specific design permits. The pins 44, 46 may have any suitable configuration such as uniform configurations being generally square for the first pins 44 and being generally cylindrical for the second pins 46. The pins may be staggered as illustrated, or may be disposed in line from row to row.

The banks of turbulator pins disclosed above cooperate with the converging cooling circuits for providing enhanced local cooling of the airfoil along the pressure sidewall which typically receives maximum heat load from the hot combustion gases during operation. The mesh pins may be used with various forms of the cooling circuits, and with other conventional features for providing tailored cooling of the different regions of the airfoil. The cooling circuits may be varied in configuration, and additional internal straight turbulators may also be used in the various cooling channels. The pressure and suction sidewalls may include various rows of the film cooling holes as required for enhancing the cooling thereof in conventional manners.

Accordingly, the combination of mesh cooling and conventional cooling features permits the designer more flexibility in defining the specific features of the cooling configuration of the airfoil for minimizing the use of cooling air therein, while maximizing the local cooling performance of the limited air. Although the cooling configurations disclosed above are found in a gas turbine engine high pressure turbine rotor blade, the mesh cooling may also be provided in turbine nozzle vanes for corresponding cooling enhancement.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine airfoil comprising:
   transversely spaced apart pressure and suction sidewalls joined together at chordally opposite leading and trailing edges and extending in span from a root to a tip;
   a septum spaced between said pressure and suction sidewalls to define with said sidewalls first and second cooling circuits extending in span along opposite sides of said septum and converging between said leading and trailing edges;
   said first circuit being disposed along said pressure sidewall, and said second circuit being disposed along said suction sidewall and extending aft from said first circuit to said trailing edge; and
   an array of pins extending inwardly from said pressure sidewall at a discharge end of one of said first and second circuits, and said pins decrease in length to conform with said one circuit converging between said leading and trailing edges.

2. An airfoil according to claim 1 wherein said first circuit includes an elongate first outlet slot extending in span along said pressure sidewall, and said second circuit includes a row of second outlet apertures terminating adjacent said trailing edge.

3. An airfoil according to claim 2 wherein said array of pins is disposed in said first circuit upstream from said first outlet slot thereof for discharging cooling air in a continuous film along said slot.

4. An airfoil according to claim 3 wherein said second circuit includes a bridge integrally joining said suction sidewall to said septum at said pin array.

5. An airfoil according to claim 4 further comprising a second array of said pins disposed in said second circuit upstream from said second outlet apertures thereof.

6. An airfoil according to claim 5 wherein said second pin array is disposed downstream from said first pin array, and integrally joins together said pressure and suction sidewalls.

7. An airfoil according to claim 6 wherein:
   said first circuit includes a single channel extending in span to provide a common inlet converging to said first array of pins; and
   said second circuit includes a plurality of bridges integrally joining together said suction sidewall to said septum to define a serpentine circuit for discharging said cooling air through second outlet apertures.

8. An airfoil according to claim 6 wherein said pins are spaced apart in span and chord along said pressure sidewall for providing a circuitous flowpath therebehind.

9. An airfoil according to claim 6 wherein said pins have a uniform spacing, and uniform configuration.

10. An airfoil according to claim 6 wherein said septum commences behind said leading edge integrally with said suction sidewall, and terminates in front of said trailing edge integrally with said pressure sidewall.

11. A turbine airfoil comprising:
spaced apart pressure and suction sidewalls joined together at chordally opposite leading and trailing edges and extending in span from a root to tip;
a septum spaced between said pressure and suction sidewalls to define with said sidewalls two cooling circuits on opposite sides of said septum converging between said leading and trailing edges; and
an array of pins extending inwardly from said pressure sidewall at a discharge end of one of said two circuits, and said pins decrease in length to conform with said one circuit converging between said leading and trailing edges.

12. An airfoil according to claim 11 wherein said septum commences behind said leading edge integrally with said suction sidewall, and terminates in front of said trailing edge integrally with said pressure sidewall.

13. An airfoil according to claim 12 wherein said two cooling circuits extend in span along opposite sides of said septum, with a first one of said circuits being disposed along said pressure sidewall, and a second one of said circuits being disposed along said suction sidewall and extending aft from said first circuit to said trailing edge.

14. An airfoil according to claim 13 wherein said first and second circuits include corresponding first and second outlets spaced apart chordally on said pressure sidewall.

15. An airfoil according to claim 14 wherein said first outlet comprises an elongate slot extending in span along said pressure sidewall, and said second outlet comprises a row of apertures terminating adjacent said trailing edge.

16. An airfoil according to claim 15 wherein said array of pins is disposed in said first circuit upstream from said first outlet slot thereof for discharging cooling air in a continuous film along said slot.

17. An airfoil according to claim 16 wherein said first circuit includes a single channel extending in span to provide a common inlet converging to said array of pins.

18. An airfoil according to claim 16 wherein said second circuit includes a bridge integrally joining said suction sidewall to said septum at said pin array.

19. An airfoil according to claim 18 wherein said second circuit includes a plurality of bridges integrally joining together said suction sidewall to said septum to define a serpentine circuit for discharging said cooling air through said second outlet apertures.

20. An airfoil according to claim 19 further comprising a second array of said pins disposed in said second circuit upstream from said second outlet apertures thereof.

21. An airfoil according to claim 20 wherein said second pin array is disposed downstream from said first pin array, and integrally joins together said pressure and suction sidewalls.

22. An airfoil according to claim 15 wherein said array of pins is disposed in said second circuit.

23. An airfoil according to claim 22 wherein said second circuit includes a plurality of bridges integrally joining together said suction sidewall to said septum to define a serpentine circuit for discharging said cooling air through said second outlet apertures.

24. An airfoil according to claim 15 wherein said pins are spaced apart in span and chord along said pressure sidewall for providing a circuitous flowpath therebehind.

25. An airfoil according to claim 24 wherein said pins have a uniform spacing, and uniform configuration.

* * * * *